(12) United States Patent
Yamaguchi

(10) Patent No.: US 7,827,417 B2
(45) Date of Patent: Nov. 2, 2010

(54) STORAGE DEVICE

(76) Inventor: Ikuo Yamaguchi, 2742-7-101, Nagatsuta-cho, Midori-ku, Yokohama-shi, Kanagawa (JP)

( * ) Notice: Subject to any disclaimer, the term of this patent is extended or adjusted under 35 U.S.C. 154(b) by 998 days.

(21) Appl. No.: 11/260,409

(22) Filed: Oct. 28, 2005

(65) Prior Publication Data

US 2006/0123247 A1 Jun. 8, 2006

(30) Foreign Application Priority Data

Nov. 15, 2004 (JP) ............... 2004-330338
Oct. 20, 2005 (JP) ............... 2005-305675

(51) Int. Cl.
*G06F 12/14* (2006.01)
*G06F 11/00* (2006.01)
*G06F 17/30* (2006.01)
*G06F 3/00* (2006.01)
*G06F 12/00* (2006.01)

(52) U.S. Cl. ............... 713/193; 713/160; 713/161; 713/162; 713/165; 713/190; 726/4; 726/6; 726/27; 726/30; 726/34; 380/277; 710/1; 710/3; 710/5; 710/13; 711/100

(58) Field of Classification Search ............... 713/193; 711/100; 380/277; 710/1
See application file for complete search history.

(56) References Cited

U.S. PATENT DOCUMENTS

| | | | | |
|---|---|---|---|---|
| 7,650,010 | B2 * | 1/2010 | Levy et al. | 382/100 |
| 2002/0097433 | A1 * | 7/2002 | Chang et al. | 358/1.15 |
| 2002/0099884 | A1 * | 7/2002 | Chang et al. | 710/62 |
| 2003/0221155 | A1 * | 11/2003 | Weibel et al. | 714/752 |
| 2004/0056864 | A1 * | 3/2004 | Valmiki et al. | 345/531 |
| 2004/0064713 | A1 | 4/2004 | Yadav | |
| 2004/0103292 | A1 * | 5/2004 | Shirouzu | 713/193 |
| 2006/0132822 | A1 * | 6/2006 | Walmsley | 358/1.14 |

FOREIGN PATENT DOCUMENTS

| | | |
|---|---|---|
| JP | 2000-287192 | 10/2000 |
| JP | 2002-24790 | 1/2002 |
| JP | 2002-55961 | 2/2002 |
| JP | 2002-91828 | 3/2002 |
| JP | 2002-109125 | 4/2002 |
| JP | 2003-174441 | 6/2003 |
| JP | 2003-233795 | 8/2003 |

(Continued)

*Primary Examiner*—Michael J Simitoski
*Assistant Examiner*—Jenise E Jackson
(74) *Attorney, Agent, or Firm*—Oblon, Spivak, McClelland, Maier & Neustadt, L.L.P.

(57) ABSTRACT

A storage device includes a storage unit that stores key information. The storage device also includes an input/output unit that inputs a converted command. Further, the storage device includes an extractor that extracts attached information from the converted command inputted, reads out, from an address according to the attached information, the key information from the storage unit, and performs an inverse data conversion corresponding to a data conversion on the converted command, using the key information, to extract command information and address information. In addition, the storage device includes an output controller that, only when the command information is equivalent to predetermined information, reads out and outputs storage data from an address of the storage unit through the input/output unit, the address of the storage data indicated by the address information extracted by the extractor.

9 Claims, 3 Drawing Sheets

FOREIGN PATENT DOCUMENTS

| | | |
|---|---|---|
| JP | 2003-258827 | 9/2003 |
| TW | 200414048 | 8/2004 |
| TW | 200424101 | 11/2004 |
| WO | WO 03/021406 A2 | 3/2003 |
| WO | WO 03/032116 A2 | 4/2003 |

* cited by examiner

STORAGE DEVICE

BACKGROUND OF THE INVENTION

1. Field of the Invention

The present invention relates to a storage device including, for example, built-in semiconductor memory, and especially relates to improvement for data security intensification within a storage device.

2. Description of the Background Art

Conventional information processors including image displays and the like can detachably connect storage devices storing software programs, data, and the like, thereby allowing execution of various software programs and utilization of data.

Some of such storage devices have security functions for security protection of data stored therein. For example, Japanese Patent Application Laid-open No. 2002-91828 has disclosed a method for keeping messages secret using encryption and decryption based on XOR (exclusive OR) operations.

SUMMARY OF THE INVENTION

The use of XOR operations has the advantage of requiring minimal processing time for encryption and decryption with use of specific hardware and the like. But on the other hand, it has the drawback that the security functions may be relatively easily analyzed because the operations themselves are general in content and thus there are a number of cues that third parties can obtain from the observation of messages transmitted between information processors and storage devices for use in the analysis of the security functions. As a countermeasure against this drawback, each storage device may have unique ID information for use in processing based on encryption and decryption, but implementation of this processing requires another specific hardware, complicated software programs, and the like.

The present invention has been made in view of the problems as described above, and an object thereof is to provide a technique for protecting data security within a storage device while minimizing changes in configuration from conventional storage devices.

According to the present invention, the storage device is capable of sequentially inputting a converted command from an information processor through an input/output unit, the converted command including command information and address information which are subjected to data conversion and additionally including attached information. The storage device includes a storage unit for storing data; an extractor for extracting the attached information from the converted command inputted, reading out key information from the storage unit according to the attached information, and performing inverse data conversion corresponding to the data conversion on the converted command, using the key information, thereby to extract the command information and the address information; and an output controller for, only when the command information is equivalent to predetermined information, reading out and outputting storage data from the storage unit through the input/output unit, the storage data corresponding to the address information extracted by the extractor.

The configuration including the storage unit and the additional extractor and output controller allows communications that prevent direct acquisition of information such as address information from converted commands, thereby improving the security of messages transmitted between the information processor and the storage device.

These and other objects, features, aspects and advantages of the present invention will become more apparent from the following detailed description of the present invention when taken in conjunction with the accompanying drawings.

DESCRIPTION OF THE PREFERRED EMBODIMENTS

Main Configuration of Cartridge

Figure 1:
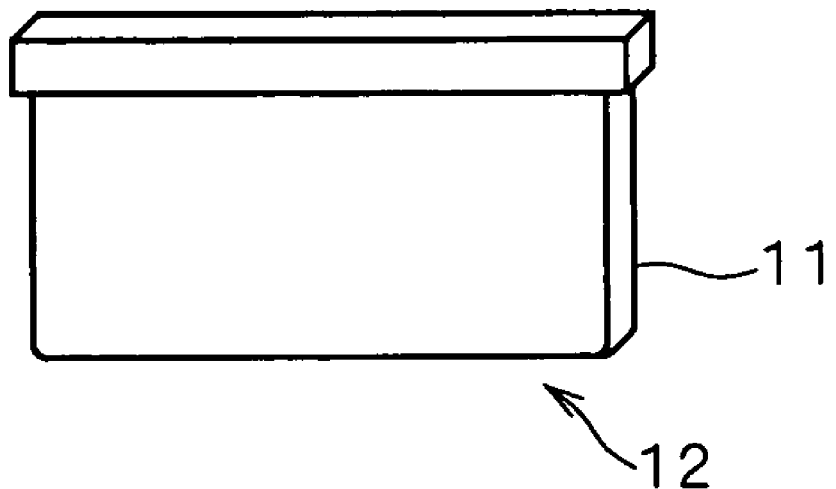
FIG. 1 is an external view showing the main configuration of a memory cartridge 1 according to a preferred embodiment of the present invention.

FIG. 1 is an external view showing the main configuration of a memory cartridge (storage device) 1 according to a preferred embodiment of the present invention.

The memory cartridge (hereinafter simply referred to as the "cartridge") 1 stores software programs and data therein and is configured to be detachably mounted on an information processor. The information processor using software programs and data stored in the cartridge 1 is, for example, a personal computer, an image processor, or portable information terminal equipment such as a personal data assistance (PDA). There are also various other forms of the information processor. For example, the present invention is also applicable to game cartridges storing game programs, and video or portable game machines which detachably mount and use the game cartridges. In the following description, all those examples are described as information processors.

The cartridge 1 includes a plate-like body unit 11 equipped with electric circuits containing semiconductor memory and the like; and an input/output unit 12 provided under the body unit 11 and having, for example, a plurality of terminals. The cartridge 1 is mounted on an information processor, so that the input/output unit 12 is electrically connected to an input/output unit of the information processor. This permits data transmission between the cartridge 1 and the information processor.

Figure 2:
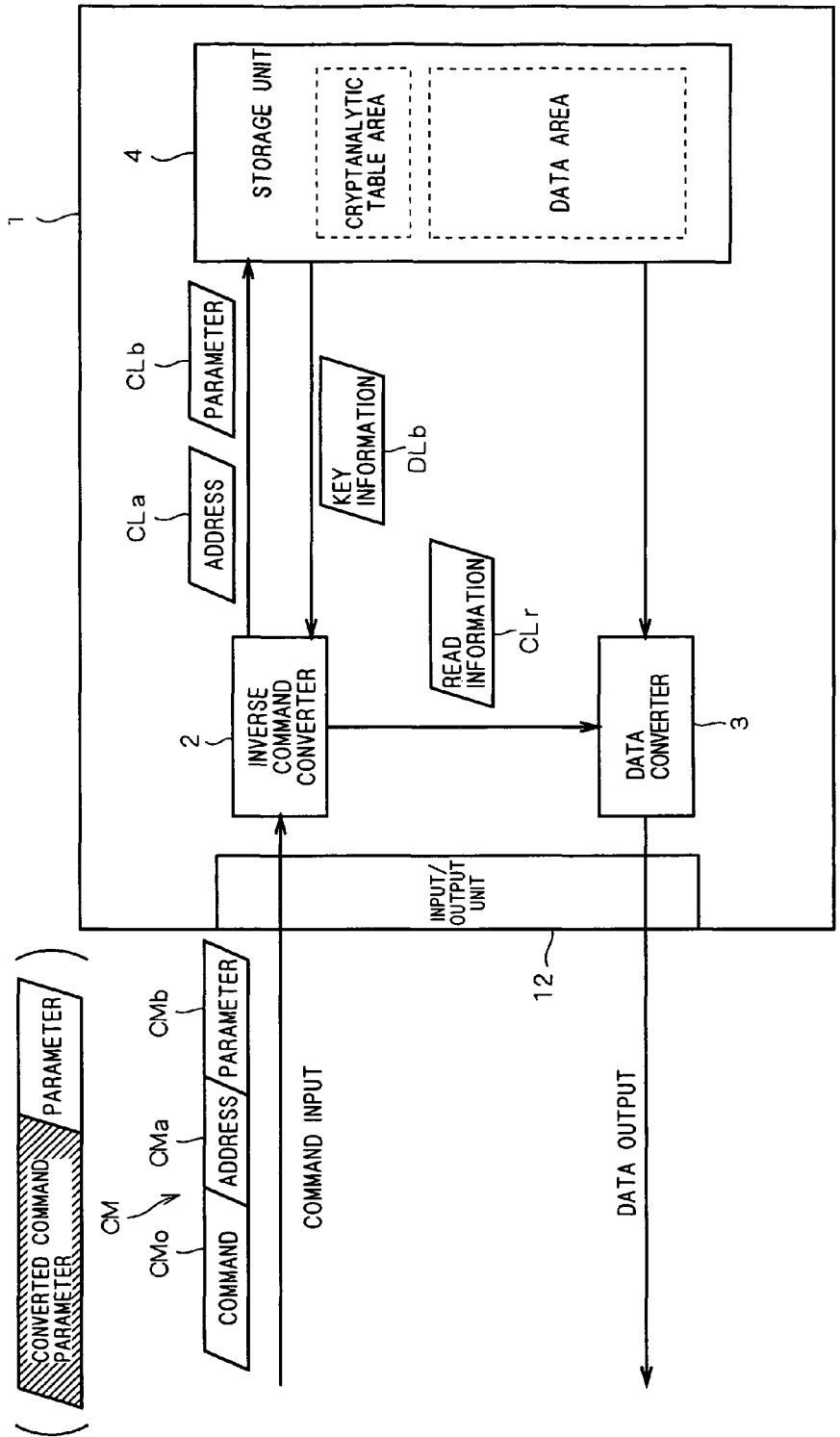
FIG. 2 is a function block diagram of the cartridge 1.

FIG. 2 is a function block diagram of the cartridge 1.

The cartridge 1 includes an inverse command converter 2 and a data converter 3 which are connected to the input/output unit 12 to allow data transmission, and a storage unit 4 connected to those converters 2 and 3 to allow data transmission.

This cartridge 1 outputs necessary data from the input/output unit 12 in accordance with a command inputted from the information processor through the input/output unit 12. Here, the input command inputted to the cartridge 1 is a command (converted command) converted by the information processor, and output data is also converted by the cartridge 1. Therefore, even if third parties observe input and output signals to and from the cartridge 1, it is difficult to analyze the contents of the signals. Hereinafter, each function block of this cartridge 1 will be described in detail.

The inverse command converter (extractor) 2 has the function of inversely converting a converted command CM which has been converted by the information processor. This inverse conversion corresponds to the conversion performed to generate the converted command CM on the information processor side, so that its method of processing has been determined previously. The inverse command converter 2 also has the function of, after restoring the converted command CM to an original command, extracting a parameter CLb and performing inverse data conversion using key information DLb that is read out from a cryptanalytic table area within the storage unit 4, using the parameter CLb, thereby to extract a command ID and address information CLa.

At this time, the first inverse data conversion corresponding to data conversion performed by the information processor is carried out using predetermined key information, or key information that is read out from the cryptanalytic table area within the storage unit 4 on the basis of a predetermined parameter. The second or later inverse data conversion using a parameter CLb extracted from a restored command is performed a plurality of times corresponding to the number of data conversions performed on the information processor side. The details of that processing will be described later. The number of data conversions should be not less than one, and preferably be two or more.

The storage unit 4 is made up of the cryptanalytic table area (key information area) for storing key information used by the inverse command converter 2 to perform inverse data conversion to restore an input command; and a data area for storing data, such as software programs, used by the information processor. The cryptanalytic table area stores key information that is necessary to perform inverse data conversions to restore commands and that is read out and used by the inverse command converter 2. The data area stores data for each address and allows extraction of storage data according to address information. Storage data extracted from the data area is transmitted to the data converter 3. Semiconductor memory used here may, for example, be either unrecordable one such as mask ROM, or recordable one such as flash memory. And in the case of using flash memory or the like, it may be either volatile or nonvolatile according to applications.

The data converter (output controller) 3 has the function of performing data conversions on storage data transmitted from the storage unit 4 and outputting the result through the input/output unit 12.

Data outputted from the input/output unit 12 is fed to the information processor, where inverse data conversions corresponding to data conversions performed by the data converter 3 are performed to restore data stored in the storage unit 4. Thereby, data requested by the input command is obtained.

The aforementioned operation of each unit of the cartridge 1 is implemented by specific hardware and software operated by power supplied from the information processor through the input/output unit 12. The inverse command converter 2 and the data converter 3 operate in accordance with operation clocks on the information processor side, using enable signals or the like supplied from the information processor.

<Cartridge Operation>

Figure 3:
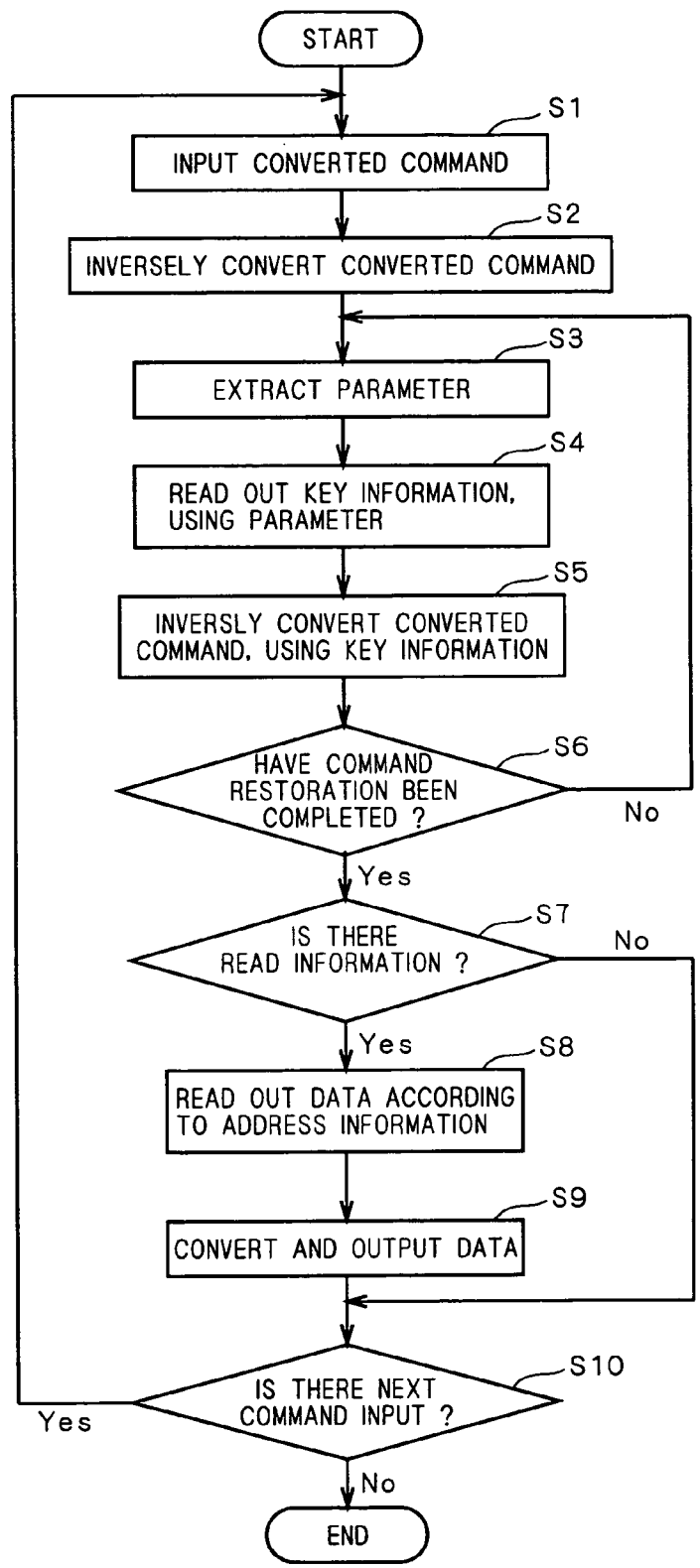
FIG. 3 is a flow chart for explaining the basic operation of the cartridge 1.

FIG. 3 is a flow chart for explaining the basic operation of the cartridge 1. This operation corresponds to processing in reading out data, such as software programs, stored in the cartridge 1. Hereinafter, the operation of the cartridge 1 will be described in detail with reference to FIGS. 2 and 3.

In step S1, the converted command CM converted on the information processor side is inputted to the cartridge 1. This input command CM is a command that the information processor inputs in sequence when reading out data from the cartridge 1 and that includes the command ID (CMo), the address information CMa, and the parameter (attached information) CMb. The parameter CMb here refers to index information necessary to read out, from the storage unit 4, key information DLb that is used for inverse data conversion of the input command CM in order to extract the command ID (CMo) and the address information CMa. The number of data conversions performed on the information processor side may be a plurality of times rather than one, and it may be either fixed or varied from command to command.

Before moving to a concrete description of the subsequent operation of the cartridge 1, we will first describe data conversions of commands performed on the information processor side. For example, a command instructing the reading of data at a certain address is converted into a form that includes the command ID (CMo) and the address information CMa. To restore this data conversion, key information is necessary. Since this key information is stored in the storage unit 4 within the cartridge 1, index information necessary to read out the key information is attached to the converted command as the parameter CMb. Then, the generated command is further converted, and index information necessary to restore this data conversion is attached in a similar manner. This processing is repeated a plurality of times. Then, finally, the entire command is converted again according to a predetermined method.

More specifically, for example in the case where the data conversion whose corresponding inverse data conversion requires key information is performed five times, as above described, the processing of attaching index information after converting a command including the command ID (CMo) and the address information CMa is repeated five times. The command obtained after completion of the fifth data conversion includes the command ID (CMo), the address information CMa, and index information attached during the first to fourth data conversions, all of which have been data converted, and additionally includes a parameter including index information necessary to restore the fifth data conversion. This command is subjected to the sixth data conversion according to a predetermined method and then fed to the cartridge 1 as the input command CM. That is, the operation of attaching a parameter to the converted command is repeated, and as a final step, a predetermined data conversion is further performed in order to prevent even the last attached parameter from retaining the original form, before input to the cartridge 1.

The last processing of converting the entire command (in the above example, the sixth processing) may use either predetermined key information, or key information that is read out from the storage unit 4 on the basis of a predetermined parameter CMb (i.e., index information). Further, the number of data conversions to be performed may be set at a fixed value, or may be varied from command to command.

In this way, performing a plurality of numbers of data conversions makes the analysis of the input command difficult. Further, the last data conversion performed on the entire command according to a predetermined method even converts the last attached parameter, which makes direct observation of the parameter value impossible even from the observation of communications between the information processor and the cartridge 1. Further, the use of the index information for data conversions allows easy modification of the method of data conversions so that, for example, even precisely identical commands instructing the reading of data at the same address can be made into different commands in appearance by changing the method of data conversions. Furthermore, varying the number of data conversions to be performed for each command makes the analysis of the contents of data conversions further difficult, which results in improved security.

As above described, the index information included in the parameter CMb is not for direct use in inverse data conversions but is only for use in reading the key information necessary for inverse data conversions from the storage unit 4.

More specifically, for example in the case of a command converted according to a predetermined method and using key information "A", not the key information "A" is directly attached as index information to that command, but index information necessary to read out this key information "A" from the storage unit 4, e.g., the value "0" indicating the address storing the key information "A" in the storage unit 4, is attached as a parameter. By attaching a parameter in this way, even if third parties succeed to analyze the input command and accordingly to extract the parameter "0", they cannot obtain the key information "A" from the parameter and consequently cannot restore the command and the address information.

Besides, this key information "A" is, as described later, stored in the cryptanalytic table area within the storage unit 4, which table area is used only for processing within the cartridge 1 and whose storage contents cannot be read out from the outside of the cartridge 1 using a read command or the like inputted from the information processor. That is, this area is protected to prevent its storage contents from being read out to the outside of the cartridge 1 by malicious third parties.

In this way, data conversions performed on the input command make analysis difficult, and even if the analysis is succeeded, information obtained therefrom is only indirect information about the key information necessary to restore the original command and address information. Further, the key information directly required for restoration is stored in the area from which data cannot be read to the outside of the cartridge 1. This achieves a high level of security for input commands.

Now, it should be noted that the command CM shown above the command input line in FIG. 2 only represents that it includes the command ID (CMo), the address information CMa, and the parameter CMb as information. Thus, it does not represent the actual position of each information in the frame nor the frame structure. For example, if the command ID (CMo) and the address information CMa are converted as a single block, the command converted and the parameter CMb constitute a converted command as shown by a parenthesized command above the command CM in FIG. 2. Then, the command converted includes the command ID (CMo) and the address information CMa as information.

In step S2, the inverse command converter 2 performs the first inverse data conversion corresponding to the predetermined and last data conversion performed on the information processor side, thereby to restore a command including the command ID and the address information which have been converted a plurality of times, and the parameter or index information attached thereto. The inverse data conversion performed at this time, as above described, can be performed without using any parameter extracted from the input command. More specifically, the first inverse data conversion may use either predetermined key information that has been prepared previously corresponding to the data conversion performed on the information processor side, or may use key information that is read out from the cryptanalytic table area within the storage unit 4 on the basis of the predetermined parameter CLb.

In step S3, the inverse command converter 2 extracts the parameter CLb from the restored command. The parameter CLb here is index information corresponding to the parameter CMb in the command. More specifically, for example as above described, the parameter CLb indicates the address storing the key information DLb necessary for inverse data conversion of the command stored in the cryptanalytic table area within the storage unit 4.

In step S4, the inverse command converter 2 reads out the key information DLb stored in the cryptanalytic table area within the storage unit 4 on the basis of the parameter CLb.

In step S5, the inverse command converter 2 performs inverse data conversion on the command ID and the address information, using the key information DLb read out in step S4.

In step S6, the inverse command converter 2 determines whether the original command ID and the original address information have been restored during the processing of step S5. If the command ID has been restored to the original form, the process goes to step S7. If the command ID has still been in its converted form, the process returns to step S3. That is, the processing of steps S3 to S5 is repeated until the command is completely restored according to the number of data conversions performed on the information processor side. Thereby, the command and the address information given from the information processor are restored.

Here, the method for determination in step S6 may be such that the number of data conversions performed on the information processor side is always constant at a predetermined number so that the completion of command restoration is the time when the corresponding number of inverse data conversions have been completed; or such that the number of data conversions performed on the information processor side is varied from command to command and, for example, information about the number of data conversions is previously provided in a parameter so that the completion of command restoration is the time when the number of inverse data conversions determined according to that information have been completed; or such that information indicating the completion of data conversions is previously provided in a parameter so that the completion of data restoration is the time when that information is recognized. In order not to endlessly repeat the processing of steps S3 to S6 even if a correct command cannot be restored by inverse data conversions because of invalid command input by third parties, for example the process should be shifted forcefully to step S7 when the completion of command restoration is still not recognized even after a predetermined number or more of inverse data conversions.

In step S7, the inverse command converter 2 determines whether or not the command ID restored after all the processing until step S6 includes read information CLr that indicates the reading of data from the storage unit 4. If the command ID includes read information, the read information CLr is transmitted to the data converter 3, and the process goes to step S8. If no read information is included, the process goes to step S1.

The absence of the read information comes from two possibilities. One is the case of invalid command input by third parties, as above described. The other is the case of a dummy command that the information processor intentionally outputs. More specifically, when requesting data reading from the cartridge 1, the information processor usually inputs a command including read information to the cartridge 1 after having performed the aforementioned data conversions. However, the information processor sometimes outputs a dummy command which is a false request, in order to confuse third parties who try to analyze input commands from observation.

The operation in the case of no read information may be such that the process goes to step S10 without doing anything; or such that, when not a dummy command from the information processor but invalid command input by third parties is detected, for example the data converter 3 outputs dummy data which is false data including random numbers and the like; or such that communications in themselves between the information processor and the cartridge 1, such as input command reception and data output, are cut off. That is, if the command information is different from predetermined information, either different data from the storage data may be outputted, or data output through the input/output unit may be stopped. This makes it difficult for malicious third parties to analyze the contents of communications between the information processor and the storage device.

In this way, the output of a dummy command from the information processor side or the output of dummy data from the cartridge 1 will confuse third parties because third parties cannot even determine whether the output is false data or normal data. This improves the security of communications between the information processor and the cartridge 1. Further, the cutting off of communications with the cartridge 1 also makes it impossible for malicious third parties to analyze the contents of communications and thus can improve security as well.

In step S8, based on the address information CLa, the data converter 3 reads out data (storage data) such as program data from the data area in the storage unit 4. The address information CLa here is equivalent to the address information CMa in the command. More specifically, the command instructing data reading indicates the address of data to be read which is stored in the data area in the storage unit 4.

In step S9, the data converter 3 performs predetermined data conversions on data that is read out from the data area in the storage unit 4, and outputs converted data through the input/output unit 12 to the information processor. On the information processor side, the output data is subjected to inverse data conversions corresponding to data conversions performed by the data converter 3 so as to be restored to original data for use by the information processor.

The data conversions performed by the data converter 3 may not use key information if receiving data is made usable by the information processor which performs corresponding inverse data conversions, or may use predetermined key information. Or, as in the case of the aforementioned inverse data conversions by the inverse command converter 2, key information that is read out from the cryptanalytic table area in the storage unit 4 may be used.

In step S10, the input/output unit 12 determines the presence or absence of the next command input. If there is the next command input, the process returns to step S1 to repeat the processing of steps S1 to S9. If there is no next command input, the operation of the cartridge 1 is completed.

Now, the aforementioned data conversions according to the present invention refer to two processing techniques: scrambling and encryption. Scrambling is a relatively easy data conversion such as changing the data structure, e.g., data alignment, according to predetermined rules using key information. On the other hand, encryption is a complicated data conversion such as converting data itself according to an algorithm or the like using predetermined key information. The data conversions of input commands and the data conversions of output data each may use either the scrambling or encryption technique. More specifically, the inverse command converter 2 may perform processing based on encryption, and the data converter 3 may perform processing based on scrambling. In this case, in correspondence with such processing, the information processor performs data conversions based on encryption for generation of input commands to the cartridge 1 and performs inverse data conversions based on scrambling for generation of output data from the cartridge 1.

Further, for example, even if both the inverse command converter 2 and the data converter 3 perform processing based on encryption, it is not necessary that the contents of the encryption should be the same.

As so far described, the present invention achieves a high level of security in the cartridge or storage device through the aforementioned operations, while the storage device additionally includes only the inverse command converter 2 and the data converter 3 within the storage unit 4 and is similar in structure to conventional storage devices with security functions. More specifically, since input commands fed to the cartridge 1 each include a different parameter and are data converted, even the same command takes different forms in appearance. This makes difficult the analysis of input commands by third parties.

Further, input commands are converted a plurality of times using key information. This key information is used only between the storage unit 4 and the inverse command converter 2 within the cartridge 1 and is protected to prevent the reading out of data from the outside of the cartridge 1. Therefore, even the observation of input and output signals to and from the cartridge 1 will not reveal any key information, which achieves a high level of security for reading out of data stored in the cartridge 1.

Furthermore, not only input commands but also output data are also converted, which further intensifies security.

The contents of data conversions correspond to key information stored in the storage unit 4 within the cartridge 1. Thus, although the corresponding contents of processing on the information processor side needs to be changed as well, it is easy to change the contents of the data conversions for each cartridge by only changing the contents of the cryptanalytic table area storing key information within the storage unit 4.

<Modifications>

Data stored in the storage unit 4 may be in commonly used data format, but should preferably be subjected to data conversions. This further improves security.

While the inverse command converter 2 and the data converter 3 are shown as separate components, a single component may achieve a processing unit for performing those data conversions.

Information such as parameters according to the present invention is not only limited to numerical information, but may be information containing only strings, or mixed information containing both numerical values and strings.

The security functions according to the present invention are controllable to be either enabled or disabled. Thus, the data conversions of input commands and the data conversions of output data each may be controlled on the side of information equipment using the present invention, according to the security functions of the information equipment.

The inverse data conversions performed by the inverse command converter 2 may be such that, as above described, commands are inversely converted using key information stored in the storage unit 4; or such that the storage unit 4 stores a plurality of software programs such as microcodes, and the inverse command converter 2 execute those programs to inversely convert commands.

While the above preferred embodiment has described the example that a command including the command ID (CMo) and the address information CMa is converted and then the parameter CMb as index information is attached to that command, the present invention is not limited thereto. For example, data conversion such as encryption itself may be such that attached information (index information) is added to converted data, so that the converted data itself represents attached information (index information). In summary, the converted command CM may be in any of the forms in which command information and address information are subjected to predetermined data conversions, and attached information is added to those converted information in one way or another.

While the invention has been shown and described in detail, the foregoing description is in all aspects illustrative and not restrictive. It is therefore understood that numerous modifications and variations can be devised without departing from the scope of the invention.

What is claimed is:

1. A storage device configured to sequentially input a converted command from an information processor, said converted command including command information and address information having been subjected to a data conversion and additionally including attached information, said storage device comprising:
   a storage unit configured to store key information;
   an input/output unit configured to input said converted command;
   an extractor configured to extract said attached information from said converted command inputted, to read out, from an address according to said attached information, said key information from said storage unit, and to perform an inverse data conversion corresponding to said data conversion on said converted command, using said key information, to extract said command information and said address information; and
   an output controller configured to, only when said command information is equivalent to predetermined information, read out and output storage data from an address of said storage unit through said input/output unit, the address of said storage data indicated by said address information extracted by said extractor.

2. The storage device according to claim 1, wherein said output controller is configured to generate converted storage data from said storage data by a predetermined data conversion and to output said converted storage data through said input/output unit.

3. The storage device according to claim 1, wherein said storage unit includes
   a key information area storing said key information, from which area said information processor cannot read out storage data; and
   a data area storing said storage data used by said information processor, from which area said information processor can read out said storage data having the address indicated by said address information.

4. The storage device according to claim 1, wherein, when said command information is not equivalent to the predetermined information, said output controller outputs different data from said storage data through said input/output unit.

5. The storage device according to claim 1, wherein, when said command information is not equivalent to the predetermined information, said output controller stops data output through said input/output unit.

6. The storage device according to claim 1, wherein said converted command is a command which has been subjected to a predetermined number of data conversions, and said extractor is configured to repeat said predetermined number of extractions of said attached information from said converted command inputted.

7. A storage device configured to sequentially input a converted command from an information processor, said converted command including command information and address information having been subjected to a data conversion and additionally including attached information, said storage device comprising:
   means for storing key information;
   means for inputting said converted command;
   means for extracting said attached information from said converted command inputted, for reading out, from an address according to said attached information, said key information from said means for storing data according to said attached information, and for performing an inverse data conversion corresponding to said data conversion on said converted command, using said key information, to extract said command information and said address information; and
   means for, only when said command information is equivalent to predetermined information, reading out and outputting storage data from an address of said means for storing data through said means for inputting, the address of said storage data indicated by said address information.

8. A method for sequentially inputting a converted command from an information processor through an input/output unit, said converted command including command information and address information having been subjected to a data conversion and additionally including attached information, said method comprising:
   reading out, from an address according to said attached information, key information from a storage unit;
   inputting said converted command;
   performing an inverse data conversion corresponding to said data conversion on said converted command, using said key information, to extract said command information and said address information; and
   reading out and outputting storage data from an address of said storage unit through said input/output unit, only when said command information is equivalent to predetermined information, the address of said storage data indicated by said address information.

9. The storage device according to claim 1, wherein the extractor is further configured to perform an inverse data conversion, using key information read out from said storage unit, on said converted command to extract said attached information.

* * * * *